(12) United States Patent
Bertosa et al.

(10) Patent No.: US 8,086,366 B2
(45) Date of Patent: Dec. 27, 2011

(54) OFF-BOARD TOOL WITH PROGRAMMABLE ACTUATOR

(75) Inventors: Thomas J. Bertosa, Mentor-On-The-Lake, OH (US); Robert C. Sheppard, Westlake, OH (US)

(73) Assignee: SPX Corporation, Charlotte, NC (US)

( * ) Notice: Subject to any disclaimer, the term of this patent is extended or adjusted under 35 U.S.C. 154(b) by 2075 days.

(21) Appl. No.: 11/024,455

(22) Filed: Dec. 30, 2004

(65) Prior Publication Data

US 2006/0149436 A1   Jul. 6, 2006

(51) Int. Cl.
*G01M 17/00* (2006.01)
*G06F 19/00* (2006.01)
*G06F 7/00* (2006.01)
*G06F 11/30* (2006.01)
*G21C 17/00* (2006.01)

(52) U.S. Cl. ............ 701/29; 701/35; 702/183; 702/185; 714/46

(58) Field of Classification Search .......... 701/1, 29–36, 701/99, 102, 114, 115; 307/9.1, 10.1, 10.4, 307/10.5; 702/182–185; 714/25–31, 45–47
See application file for complete search history.

(56) References Cited

U.S. PATENT DOCUMENTS

| | | | | |
|---|---|---|---|---|
| 4,267,569 A | * | 5/1981 | Baumann et al. | 701/99 |
| 4,698,618 A | * | 10/1987 | Liuzzo et al. | 379/267 |
| 5,245,324 A | * | 9/1993 | Jonker et al. | 345/440.1 |
| 5,541,840 A | * | 7/1996 | Gurne et al. | 701/33 |
| 6,640,166 B2 | * | 10/2003 | Liebl et al. | 701/29 |
| 6,728,603 B2 | * | 4/2004 | Pruzan et al. | 701/1 |
| 2002/0044413 A1 | * | 4/2002 | Chu-Chia | 361/683 |
| 2005/0131595 A1 | * | 6/2005 | Luskin et al. | 701/29 |
| 2005/0273213 A1 | * | 12/2005 | Little | 701/1 |
| 2006/0101074 A1 | * | 5/2006 | Cancilla et al. | 707/104.1 |
| 2006/0106510 A1 | * | 5/2006 | Heffington | 701/29 |

OTHER PUBLICATIONS

Logitech G11 Gaming Keyboard (Black/Silver). http://www.amazon.com/Logitech-Gaming-Keyboard-Black-Silver/dp/B000GP844S/ref=sr_1_1?s=electronics&ie=UTF8&qid=1296659821&sr=1-1. Downloaded on Feb. 2, 2011. Date first available at Amazon.com: Oct. 2, 2001.*

* cited by examiner

*Primary Examiner* — Mark Hellner
*Assistant Examiner* — Ari M. Diacou
(74) *Attorney, Agent, or Firm* — Baker & Hostetler LLP

(57) ABSTRACT

A programmable actuator having multiple programmable functions is provided. The programmable actuator may be used on an off-board tool. In accordance with an embodiment, an off-board tool, OBT, including a user-defined programmable actuator is provided. In accordance with another embodiment, an OBT includes a processor, an internal memory, a programmable actuator, program logic and perform function logic. In accordance with yet another embodiment, a method of actuating performance of a user-defined series of functions for a OBT is provided. The method includes the step of actuating a programmable actuator of the OBT with a single actuating action.

14 Claims, 6 Drawing Sheets

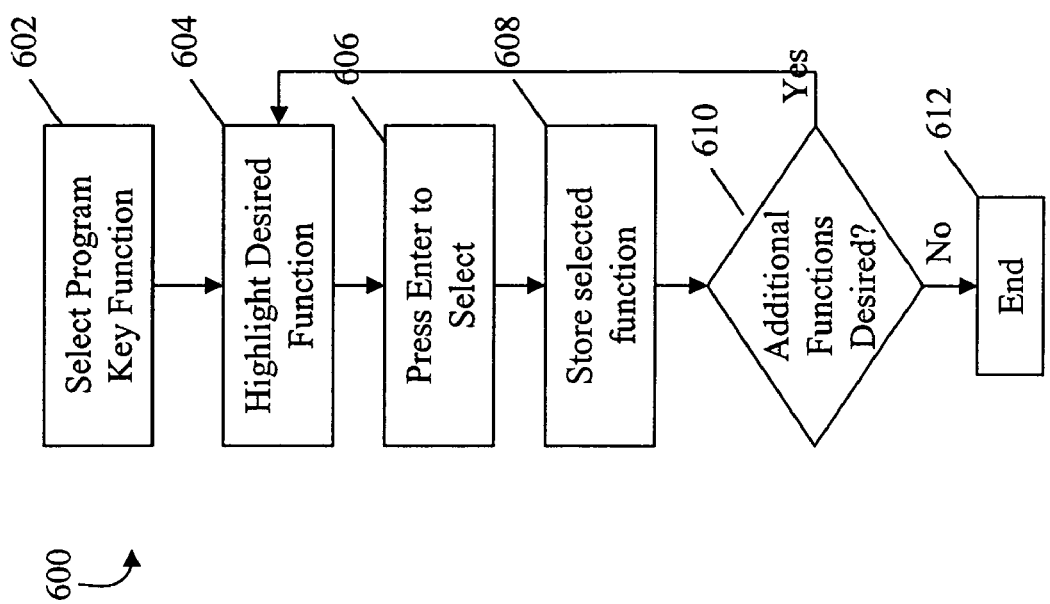

OFF-BOARD TOOL WITH PROGRAMMABLE ACTUATOR

BACKGROUND

Modern vehicles typically include a vehicle diagnostic system having one or more computer modules, or on-board devices, such as, engine control units and transmission control units. The computer modules communicate over a data bus. A data link connector (DLC) on-board the vehicle, is also connected to the data bus. Off-board tools (OBT,) such as, for example scan tools, code readers, and inspection maintenance tools, are configured to connect with the vehicle diagnostic system via the DLC.

Electronic signals such as, information or data, indicating the status of various vehicle systems (e.g., Diagnostic Trouble Codes, or DTCs) are communicated from the vehicle diagnostic system to the OBT via the data bus and the DLC. Among other things, the OBT reads and displays the diagnostic information (e.g., the DTCs) indicating the status of the vehicle systems.

User interfaces of OBT's are often cumbersome, confusing, complicated and/or crowded. Numerous buttons are often provided to perform numerous functions, many of which are sparsely used.

SUMMARY

A programmable actuator having multiple programmable functions is provided. The programmable actuator may be used on an off-board tool. In accordance with an embodiment, an off-board tool, including a user-defined programmable actuator is provided.

In accordance with another embodiment, an off-board tool is provided. The OBT includes a processor, an internal memory, a programmable actuator, program logic and perform function logic.

In accordance with another embodiment, a method of actuating performance of a user-defined series of functions for a OBT is provided. The method includes the step of actuating a programmable actuator of the OBT with a single actuating action.

BRIEF DESCRIPTION OF THE DRAWINGS

FIG. 6 is a block diagram of an exemplary methodology of programming a programmable key, or hot key.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

As used herein, "logic" is used generically and includes but is not limited to hardware, software and/or combinations of both to perform a function.

As used herein, "software" is used generically and includes but is not limited to one or more computer executable instructions, scripts, routines, algorithms, modules or programs (including separate applications or from dynamically linked libraries) for performing functions as described herein. Software may also be implemented in various forms such as a servlet, applet, stand-alone, plug-in or other type of application. Software can be maintained on various computer readable mediums as known in the art.

Figure 1:
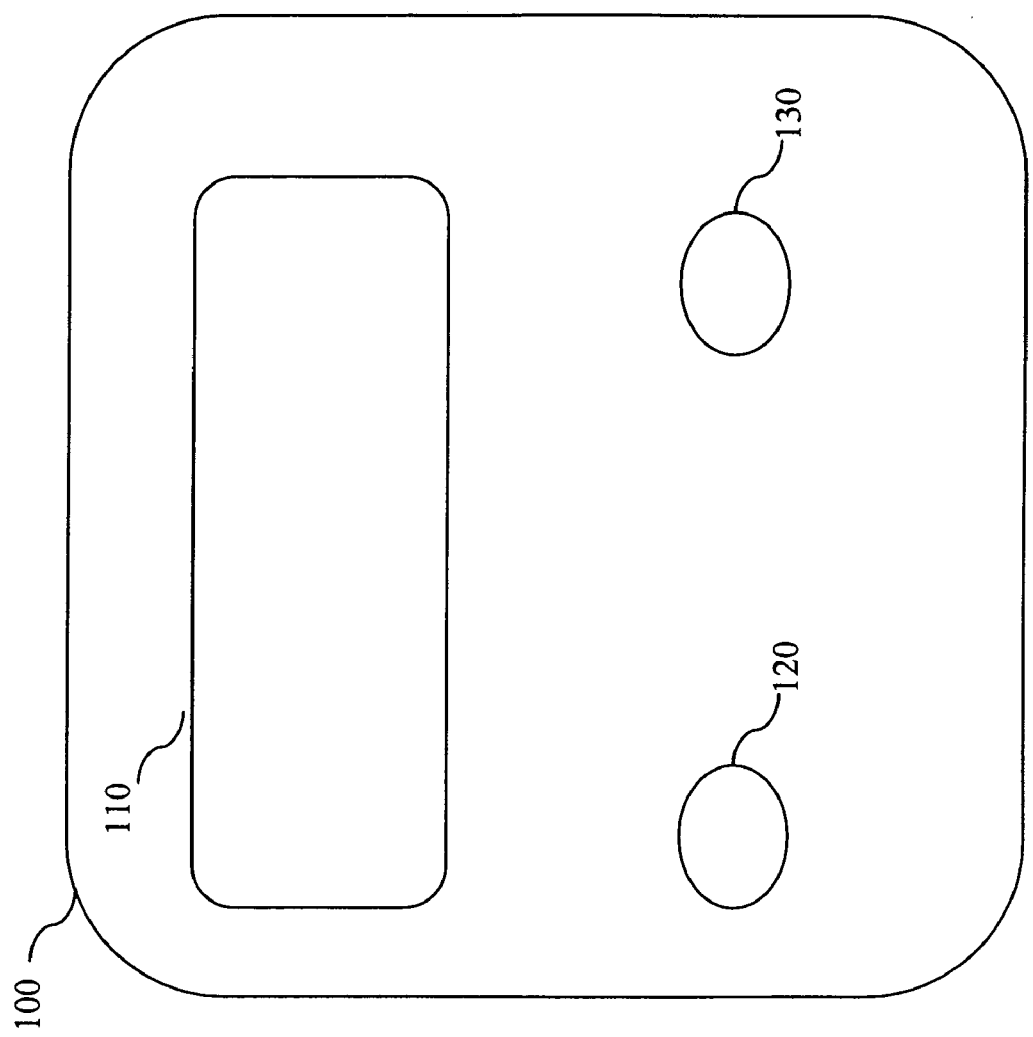
FIG. 1 is a front view of an exemplary OBT including a read/scroll actuator.

With reference to FIG. 1, an exemplary OBT with a read/scroll actuator is illustrated. It will be appreciated that OBT 100 is any suitable OBT, including but not limited to a scan tool, a code reader and any instrument, hand-held or otherwise, which is used to extract data or information from a vehicle on-board diagnostic system, such as for example DTCs. Embodiments set forth herein are illustrated with respect to an exemplary OBT 100, although it will be appreciated that the embodiments need not be limited to any particular OBT.

Exemplary OBT 100 includes a display 110, a read/scroll actuator 120 and, optionally, an erase actuator 130. Display 110 is any device or mechanism capable of displaying information, such as, for example, one or more DTCs, or parts thereof. Any suitable display is used, including but not limited to an LCD screen, an LED display and a print-out.

Read/scroll actuator 120 is any suitable input, electronic or manual, including a key, a button, a toggle, a flip switch touch screen, or any other device. In embodiments described herein, a read/scroll button 120 is used as an exemplary actuator, though it will be appreciated that this disclosure need not be so limited.

Pressing read/scroll button 120 (or, actuating read/scroll actuator 120) causes OBT 100 to perform one of two functions—either a read function or a scroll function. In performance of the read function (or, during the "read mode"), the OBT 100 reads data, or information, such as, for example, one or more DTCs, from the vehicle diagnostic system. The use or the term DTCs is not meant to limit the scope of the invention, as any information may be retrieved and displayed. As described further herein, the DTC code(s) are optionally stored in an internal memory of the off-board tool and one DTC is displayed on display 110 at a time. Optionally, a group or plurality of DTCs, or other information is displayed on one screen at one time.

In performance of the scroll function (or, during the "scroll mode"), the OBT 100 scrolls through one or more DTCs so that one, or multiple, DTC(s) are displayed at a time on display 110. In an embodiment, when more than one DTC is stored in the OBT's internal memory, each performance of the scroll function displays another stored DTC. DTCs are optionally ordered in their display during the scroll function. For example, each performance of the scroll function displays the "next" DTC in the sequence of DTCs in memory. For the purposes of this example, assume that three DTCs are stored in the internal memory of the OBT and sequenced in any suitable manner (such as, e.g., by the order in which they were read, the order in which they were outputted, the order in which they occurred, etc.); each performance of the scroll function displays the "next" DTC in the sequence. In an embodiment, the DTCs are continually scrolled, wherein once the end of the sequence is displayed, the first DTC in the sequence is displayed upon the next performance of the scroll function. Optionally, a means for scrolling back to the previous display is provided, such as, for example, holding the scroll actuator down for a specified period of time. In an embodiment, multiple DTCs are displayed on each screen and the scroll function may scroll to another set of DTCs or move one DTC out and the next DTC in.

In an embodiment, performance of the read function or the scroll function upon pressing of the read/scroll button 120 is contextually dependant. For example, in an embodiment, performance of either the read or the scroll function is dependant upon the contents of the internal memory of the OBT, or dependant upon the contents of the display 110. If the internal memory, of the scan tool does not contain any DTCs to display, or no DTC's are displayed on the screen actuating the read/scroll button 120 performs the read function, which reads information, such as, one or more DTCs. If the internal memory contains a plurality of DTCs, actuating the read/scroll button 120 performs the scroll function, which displays the "next" DTC on the display 110. In the event that there is one DTC in memory, and that DTC is currently displayed on display 110, actuating the read/scroll button 120 optionally performs the scroll function and redisplays the currently displayed DTC, and further optionally indicates that no additional DTCs are in memory. Optionally, similarly if a DTC is displayed, actuating the read/scroll button 120 perform the scroll function. Again, of course, as with the other embodiments described herein, other information or data can be retrieved and displayed in a similar manner.

In another embodiment, performance of the read function or the scroll function is dependant upon the amount of time the read/scroll button 120 is actuated. For example, a brief pressing of the read/scroll button 120 performs a scroll function, while a longer pressing of the read/scroll button 120 performs a read function. Any suitable period of time for pressing is used. For example, any pressing of read/scroll button 120 for a period of time between about 2 seconds and about 10 seconds, or greater, effectuates performance of the read function. Any DTCs currently stored in the OBT's internal memory are optionally erased or overwritten by newly-read DTCs. In an embodiment, this "cut off" time is about 3 seconds. Any pressing of the read/scroll button 120 for a period of time less than the "cut off" time effectuates the scroll function.

In another embodiment, performance of the read function or the scroll function is dependant upon both the amount of time the read/scroll button 120 is pressed and upon the contents of the OBT's internal memory or the content of the OBT's display. For example, if the internal memory is empty, or no vehicle information is currently displayed, pressing the read/scroll button 120 effectuates a read function, regardless of how long the button is pressed. If a plurality of DTCs currently exists in the internal memory or one or more DTCs are displayed on the display, the function effectuated is dependant upon the amount of time the read/scroll button 120 is pressed. For each shorter press, the scroll function is effectuated. For longer presses, the read function is effectuated. If only one DTC is in memory, and that DTC is currently being displayed on display 110, a longer press of the read/scroll button 120 optionally effectuates a read function, while a shorter press (e.g., one below the pre-determined "cut off" time) optionally performs no function or effectuates the scroll function (thus redisplaying the currently-displayed DTC, with or without an indication that no additional DTCs are in memory) or otherwise indicates that no additional DTCs are in memory for display. While the descriptions above illustrate exemplary embodiments of contextually-dependant performances of either the read mode or the scroll mode, it will be appreciated that any suitable contextually-dependant rules are optionally used.

Erase actuator 130 is any suitable input, electronic or manual, including a button, a key, a toggle, a flip switch, touch screen or any other device. In embodiments described herein, an erase button 130 is used as an exemplary actuator, though it will be appreciated that this disclosure need not be so limited.

Pressing erase button 130 (or, actuating erase actuator 130) causes OBT 100 to perform an erase function; namely, to erase DTCs contained in the vehicle diagnostic system, and, optionally, to clear the display 110 and/or the OBT's internal memory. Erase button 130 is actuated in any suitable manner. For example, erase button 130 is optionally configured to effectuate an erase function only after the erase button 130 is pressed for a pre-determined amount of time or longer. In this example, pressing the erase button 130 for a shorter period of time (e.g., about 5 seconds or less), does not effectuate the erase function. Only pressing the erase button 130 for a longer period of time effectuates the erase function. While an exemplary "cut off" time of 5 seconds is illustrated, it will be appreciated that any suitable amount of time is optionally used. Suitable "cut off" times are between about 1 second and about 30 seconds.

Figure 2:
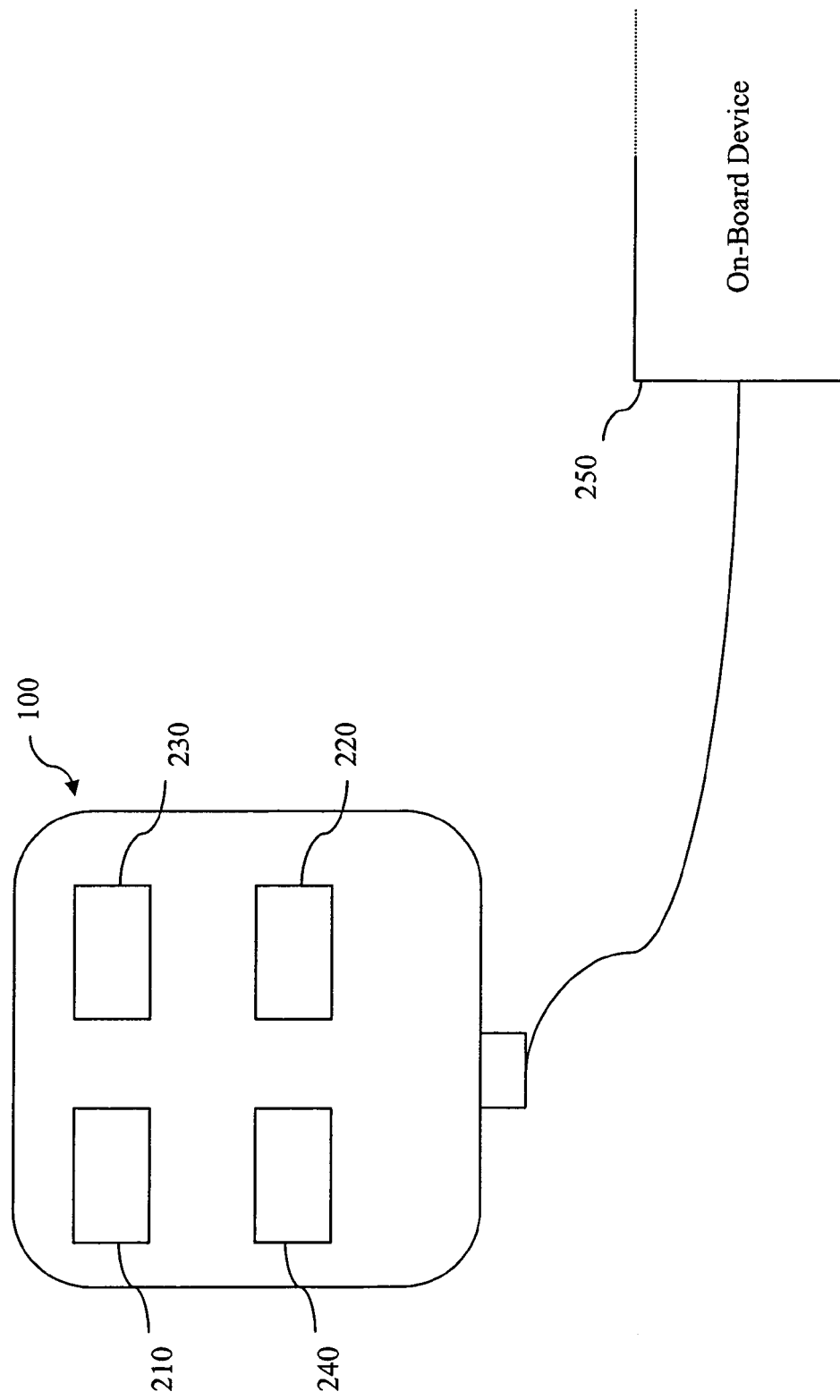
FIG. 2 is a system view of an exemplary OBT communicating with a vehicle diagnostic system.

With reference to FIG. 2, in an embodiment, OBT 100 electronically communicates with vehicle diagnostic system 250 to receive data or information, such as, one or more DTCs there from. OBT 100 optionally includes one or more of internal memory 210, one or more processors 220, read logic 230 and scroll logic 240. Internal memory 210 is any memory device capable of storing information or data, such as, one or more DTCs. Internal memory 210 optionally stores information, such as, one or more DTC's received from the vehicle diagnostic system e.g., from performance of a read function. Internal memory 210 is accessed by processor 220 in performance of either or both a read function or a scroll function. Processor 220 is any processor capable of performing read logic or scroll logic (described below) and further capable of electronically accessing internal memory 210 in performance thereof.

Read logic 230 includes any suitable steps, methods, processes and/or software for performing a read function. For example, read logic accesses, e.g., vehicle diagnostic system 250 and retrieves information, such as, one or more DTCs there from. The information is stored in internal memory 210. Information previously stored in internal memory 210 is replaced by new information, or is optionally erased. Any information previously displayed is optionally removed from the display. One retrieved piece of information is optionally displayed on the display.

Scroll logic 240 includes any suitable steps, methods, processes and/or software for displaying information, such as, at least one DTC on the display. For example, wherein a plurality of DTCs are stored in internal memory 210, scroll logic retrieves the "next" DTC in memory and displays it. Sequencing of the DTCs in memory, and thus the determination of which DTC is "next," is accomplished in any suitable manner, including as described herein. Scroll logic 240 optionally continually loops through the DTCs in memory, wherein upon displaying the "last" DTC, the next DTC displayed is the "first" DTC in the sequence of DTCs in internal memory.

Figure 3:
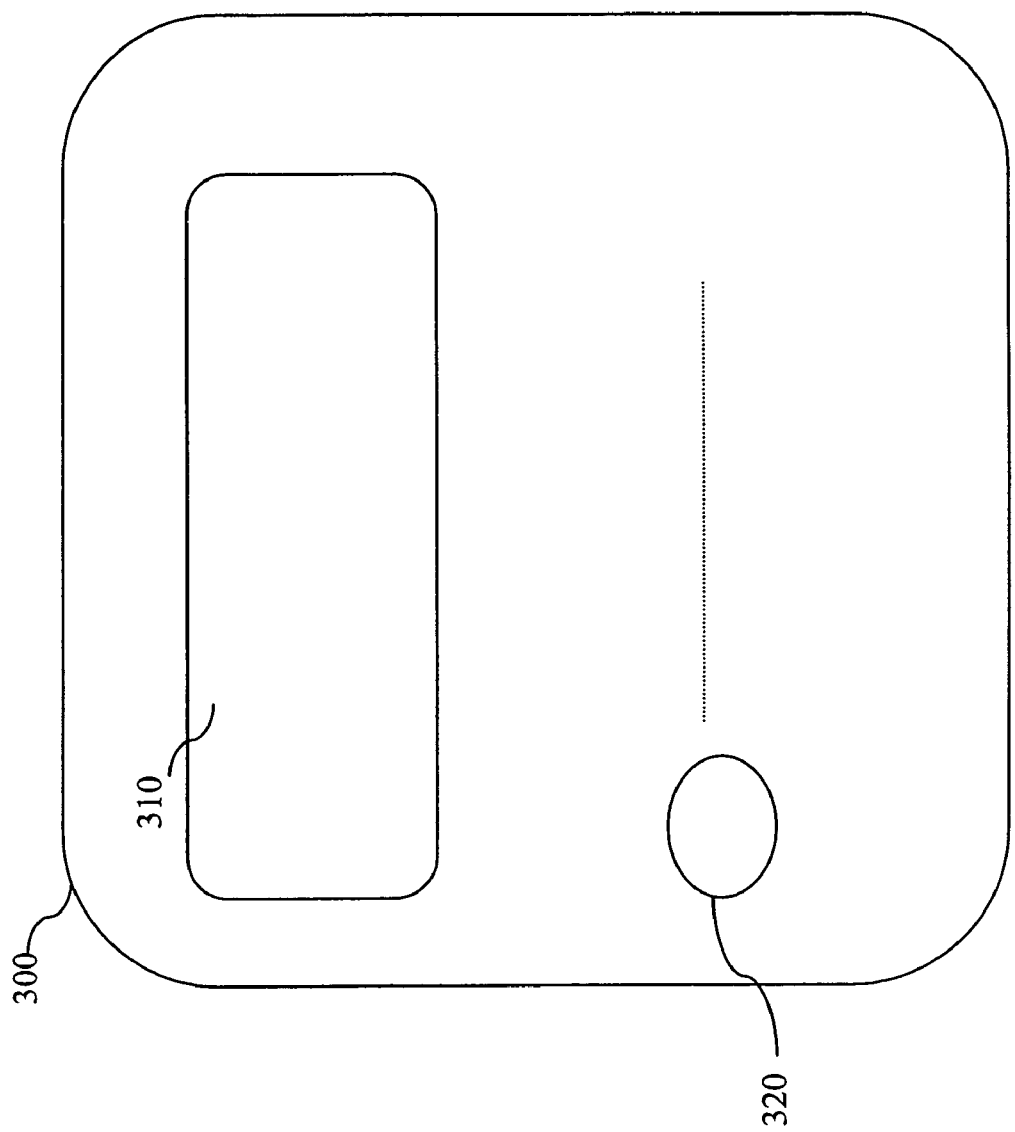
FIG. 3 is a front view of an exemplary OBT including a programmable key, or hot key.

With reference to FIG. 3, in an embodiment, an OBT with a programmable actuator is illustrated. It will be appreciated that OBT 300 is any suitable OBT, including but not limited to a scan tool, a code reader and any instrument, hand-held or otherwise, which is used to extract data or information from an on-board vehicle diagnostic system, such as, for example, DTCs. Embodiments set forth herein are illustrated with respect to an exemplary OBT 300, although it will be appreciated that the embodiments need not be limited to any particular OBT.

Exemplary OBT 300 includes a programmable actuator 320 and, optionally, a display 310. Display 310 is any device capable of displaying information, such as, for example, one or more DTCs, or parts thereof. Any suitable display is used, including but not limited to an LCD screen, an LED display and a print-out.

Programmable key 320 is any suitable electronic or manual actuator, including a key, button, a toggle, a flip switch, touch screen or any other device. In embodiments described herein, a programmable key or button 320 is used as an exemplary actuator, though it will be appreciated that this disclosure need not be so limited.

Pressing programmable key 320 causes OBT 300 to perform the one or more functions which have been programmed to perform upon actuation. Programmable key 320 is a user-defined programmable key. A user selects one or more functions for performance and programs OBT 300 to perform the functions upon actuation of programmable key 320.

Any suitable function, functions or sequence of functions is/are optionally programmed into programmable key 320. For example, suitable functions include but are not limited to, alone or in any combination thereof, read codes, inspection maintenance (I/M) readiness, erase codes, vehicle information, view data, freeze frame, pending codes, oxygen monitor data, diagnostic monitor data, print, contrast adjust, and English/metric setup. An additional example is the service code functions defined in SAE J1979 (incorporated herein by reference) for diagnostic service definitions for ISO 9141-2, ISO 14230-4, SAE J1850, ISO 15765-4 and SAE 1939. For example, the functions optionally include Request Current Powertrain Diagnostic Data (Service $01), Request Powertrain Freeze Frame Data (Service $02), Request Emission-Related Diagnostic Trouble Codes (Service $03), Clear/Reset Emission-Related Diagnostic Information (Service $04), etc.

The functions are optionally programmed in any suitable sequence and further optionally include wait states for, e.g., further user input and/or review. For example, a user may program the OBT 300 to Request Current Powertrain Diagnostic Data, wait for acknowledgement from a user, Request Emission-Related Diagnostic Trouble Codes, wait for acknowledgment from a user, and then Clear/Reset Emission-Related Diagnostic Information upon user input. While this example illustrates three functions with multiple wait states and user input, it will be appreciated that any suitable sequence of functions, including suitable wait states/user input, is optionally used.

The programmed functions are stored in the OBT 300 (described below). Execution (or performance) of the functions commences when the programmable key 320 is actuated by a user. Actuation is optionally achieved by pressing the programmable key 320 one time. Minimal time pressing requirements are optionally employed. For example, actuation of the programmable key 320 optionally requires pressing the key for at least a pre-determined amount of time, such as, e.g., one second. It will be appreciated that any suitable time period is optionally used, including from one-tenth of second up to 10 seconds, and optionally more.

Figure 4:
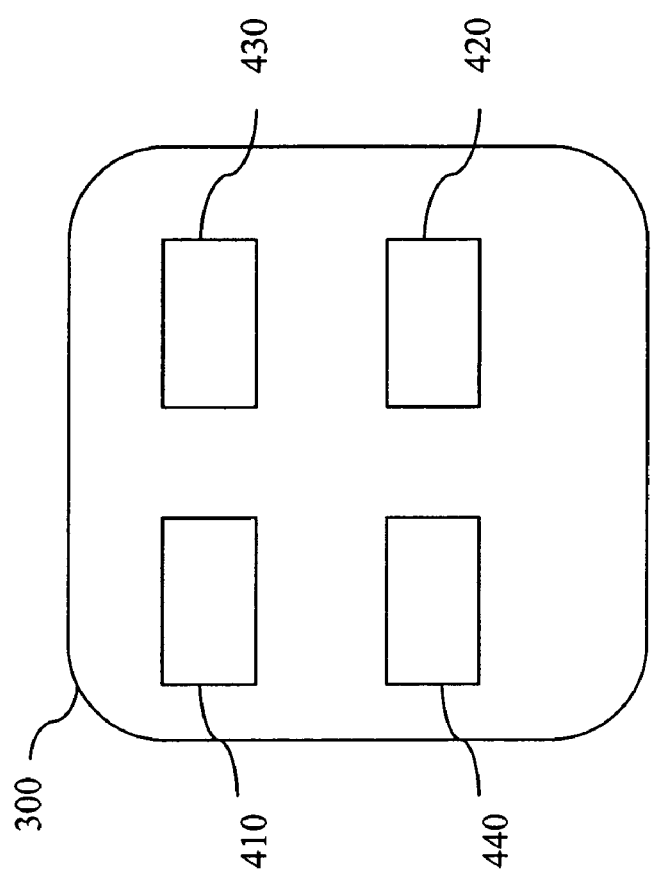
FIG. 4 is an exemplary system diagram of components of an exemplary OBT including a programmable key, or hot key.

With reference to FIG. 4, in an embodiment OBT 300 includes internal memory 410, one or more processors 420, program logic 430 and perform function logic 440. Internal memory 410 is any memory capable of storing one or more functions for performance. Processor 420 is any processor capable of performing the functions stored in the internal memory. Upon actuating programmable key 320, the processor begins execution of the functions programmed and stored in the internal memory.

Program logic 430 includes any suitable steps, methods, processes and/or software for programming one or more functions to be performed upon actuation of programmable key 320. In an embodiment, a user-defined or selected sequence of functions (which are optionally one or more functions further optionally ordered in a sequence) is created on a computing device external to OBT 300. Any suitable computing device is optionally used, including but not limited to a personal computer. In the example of a personal computer, the personal computer optionally runs one or programs which facilitates creation of a function list (or function program or program). The program is exported from the personal computer to the internal memory of the OBT by any suitable mechanism, including but not limited to via a standard I/O port or a DLC. The program remains in the internal memory for execution upon actuation of the programmable key 320. Other means for programming the programmable key 320 include providing a list of available functions and allowing the user to scroll through the list and select desired functions and/or the order the selected functions that are performed upon actuating the programmable key 320.

Perform function logic 440 includes any suitable steps, methods, processes and/or software for performing (or executing) the functions of the program stored in the internal memory. In an embodiment, after actuation of the programmable key 320, perform function logic 440 loads the program and the program is executed by the processor 420 and any peripherals at the processor's direction. Perform function logic 440 optionally facilitates wait state(s) and input from a user during performance of a program.

Figure 5:
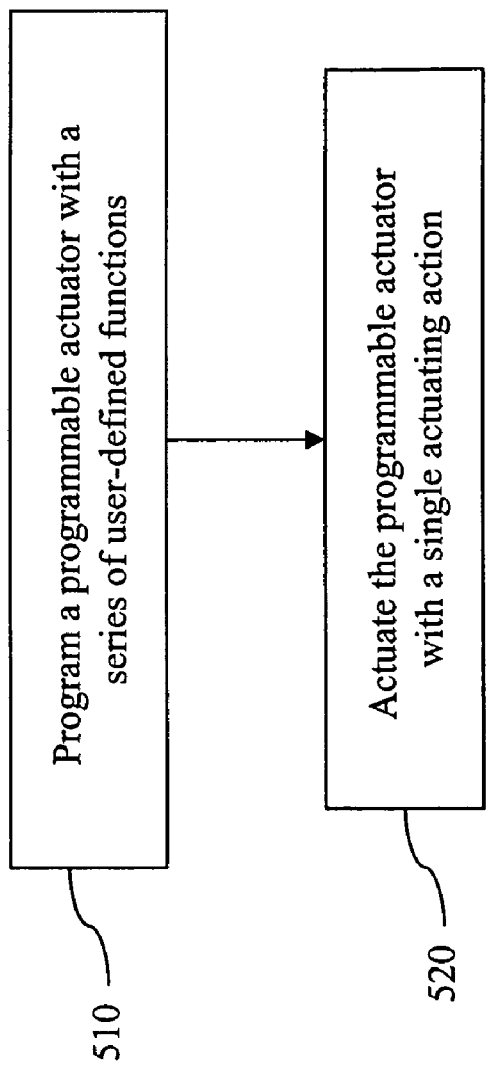
FIG. 5 is a block diagram of an exemplary methodology for actuating performance of a user-defined series of functions for an OBT.

In an embodiment, FIG. 5 shows an exemplary methodology for actuating an OBT to perform a user-defined series of functions. The blocks shown represent functions, actions or events performed therein. If embodied in software, each block may represent a module, segment or portion of code that comprises one or more executable instructions to implement the specified logical function(s). If embodied in hardware, each block may represent one or more circuits or other electronic devices to implement the specified logical function (s). It will be appreciated that computer software applications involve dynamic and flexible processes such that the functions, actions or events performed by the software and/or the hardware can be performed in other sequences different than the one shown.

With reference to FIG. 5, an exemplary methodology is described. At 510, a programmable actuator of an OBT is programmed with a plurality of user-defined functions. At 520, performance of the plurality of user-defined functions is actuated by actuating the programmable actuator using a single actuating action. Any suitable actuating action is optionally used, including pressing the programmable actuator.

Although the flow chart herein shows an exemplary order of execution, it is understood that the order of execution for other embodiments may differ from that which is depicted. Also, two or more blocks shown herein may be combined and/or executed concurrently or with partial concurrence. It is understood that all such variations are within the scope of various embodiments of the present invention.

FIG. 6 illustrates an exemplary methodology 600 of programming a programmable key or hot key. The methodology begins by selecting the program key function at block 602. Selecting the program key function can be accomplished by, for example, selecting the program key function from a menu, or pressing the programmable key and holding it down for a specified period of time, such as, for example 5 seconds or optionally pressing the program key prior to connecting the OBT to the vehicle. At block 604 the desired function to be programmed is highlighted. The function may be highlighted by, for example, scrolling down the list until the desired function is highlighted. Scrolling down can be accomplished by holding down the key for a period less than a predetermined time. At block 606 the desired function is selected by pressing an enter key, or by for example, holding the key down for longer than a predetermined time. The selected function is stored at block 608. The selected function is stored in non-volatile memory so that the programmed key need not be reprogrammed each time after the OBT is turned off. Optionally, the selected function is stored in volatile memory, and reprogrammed after the OBT is cycled on from an off state. At block 610 a determination is made whether additional functions are desired to be programmed. If additional functions are desired the process loops back to block 604. If no additional functions are desired, the methodology ends at block 612.

While the present invention has been illustrated by the description of embodiments thereof, and while the embodiments have been described in considerable detail, the scope of the appended claims should not be restricted or in any way limited to such detail. Additional advantages and modifications will readily appear to those skilled in the art. Therefore, the invention, in its broader aspects, is not limited to the specific details, the representative systems, and illustrative examples shown and described. Accordingly, departures may be made from such details without departing from the spirit or scope of the invention disclosed herein.

The invention claimed is:

1. A diagnostic device for obtaining information from a vehicle diagnostic system, comprising:
    a processor coupled to an internal memory;
    a single-input programmable actuator;
    a program logic configured to program the programmable actuator, wherein a plurality of diagnostic functions for the programmable actuator and a sequence of performing the plurality of diagnostic functions are created and stored in the internal memory; and
    a perform function logic configured to program the plurality of diagnostic functions stored in the internal memory, wherein the processor is configured to execute any of the plurality of diagnostic functions upon actuation of the programmable actuator.

2. The diagnostic device of claim 1, wherein the programmable actuator is a programmable button.

3. The diagnostic device of claim 1 wherein the plurality of diagnostic functions is selected from a list including one or more of: read codes, I/M readiness, or erase codes.

4. The diagnostic device of claim 1, wherein the plurality of diagnostic functions is selected from a list including one or more of: view data, freeze frame, pending codes, oxygen monitor data, or diagnostic monitor data.

5. The diagnostic device of claim 1, wherein the program logic creates the plurality of diagnostic functions on a remote computer and uploads the diagnostic functions to the diagnostic device.

6. The diagnostic device of claim 1, wherein the perform function logic performs the diagnostic functions in the sequence set forth in the program logic.

7. The diagnostic device of claim 1, wherein the program logic selects the plurality of diagnostic functions for the programmable actuator from a list of functions in the internal memory or in response to variable inputs from the actuator, and wherein the plurality of diagnostic functions is configured to control an integrated display and data management for the diagnostic device.

8. A diagnostic device for obtaining information from a vehicle diagnostic system, comprising:
    means for processing coupled to an internal means for storing;
    single-input programmable means for actuating;
    a program logic for configured to program the programmable means for actuating, wherein a plurality of diagnostic functions for the programmable means for actuating and a sequence of performing the plurality of diagnostic functions are capable of being created and stored in the internal means for storing; and
    a perform function logic configured to program the plurality of diagnostic functions stored in the internal means for storing,
    wherein the means for processing is configured to execute any of the diagnostic functions upon actuation of the programmable means for actuating.

9. The diagnostic device of claim 8, wherein the programmable means for actuating is a programmable button.

10. The diagnostic device of claim 8, wherein the plurality of diagnostic functions is selected from a list including one or more of: read codes, I/M readiness, or erase codes.

11. The diagnostic device of claim 8, wherein the plurality of diagnostic functions is selected from a list including one or more of: view data, freeze frame, pending codes, oxygen monitor data, or diagnostic monitor data.

12. The diagnostic device of claim 8, wherein the program logic creates the plurality of diagnostic functions on a remote computer and uploads the functions to the diagnostic device.

13. The diagnostic device of claim 8, wherein the perform function logic performs the diagnostic functions in the sequence set forth in the program logic.

14. The diagnostic device of claim 8, wherein the program logic selects the plurality of diagnostic functions for the programmable means for actuating from a list of functions in the internal means for storing or in response to variable inputs from the actuator, and wherein the plurality of diagnostic functions is configured to control an integrated means for displaying and data management for the diagnostic device.

* * * * *